United States Patent [19]

Heeger

[11] 4,409,649

[45] Oct. 11, 1983

[54] SEQUENCE CONTROLLER WITH MICROPROCESSOR

[75] Inventor: Stephen E. Heeger, Evansville, Ind.

[73] Assignee: AMF Incorporated, White Plains, N.Y.

[21] Appl. No.: 203,883

[22] Filed: Nov. 4, 1980

Related U.S. Application Data

[63] Continuation of Ser. No. 928,905, Jul. 28, 1978, abandoned.

[51] Int. Cl.³ .................. G05B 19/04; G06F 15/46
[52] U.S. Cl. .................. 364/144; 222/641; 364/146; 364/479; 364/569
[58] Field of Search ............ 364/478, 479, 140–147, 364/188, 189, 550, 551, 570, 571, 579, 569, 200 MS File, 900 MS File, 510; 324/73 R, 73 AT; 307/141, 141.4, 141.8, 41; 222/638–652, 129.4; 194/1 N, 2, 3, 10; 340/309.15, 309.4

[56] References Cited

U.S. PATENT DOCUMENTS

| | | | |
|---|---|---|---|
| 3,409,176 | 11/1968 | Krause | 222/70 |
| 3,565,227 | 2/1971 | Flevaris | 194/9 |
| 3,662,186 | 5/1972 | Karklys | 307/141 |
| 3,669,312 | 6/1972 | Kuckens et al. | 307/141 X |
| 3,686,639 | 8/1972 | Fletcher et al. | 364/900 |
| 3,695,314 | 10/1972 | Watts et al. | 222/129.4 X |
| 3,731,777 | 5/1973 | Burke et al. | 222/2 X |
| 3,783,651 | 1/1974 | Karklys | 307/141 |
| 3,790,815 | 2/1974 | Karklys | 307/141 |
| 3,802,542 | 4/1974 | Lamb | 194/13 |
| 3,815,717 | 6/1974 | Arseneau | 194/1 N |
| 3,825,153 | 7/1974 | Patrick et al. | 194/13 X |
| 3,840,752 | 10/1974 | Eshraghian | 307/141 |
| 3,891,075 | 6/1975 | House | 194/9 |
| 3,904,079 | 9/1975 | Kross | 222/129.4 X |
| 3,922,889 | 12/1975 | Karklys | 307/141 |
| 3,928,803 | 12/1975 | Hugon et al. | 324/181 |
| 3,935,435 | 1/1976 | Greenwood | 194/13 X |
| 3,939,453 | 2/1976 | Schroeder | 364/140 X |
| 3,967,103 | 6/1976 | Cachuela et al. | 324/73 R X |
| 3,969,703 | 7/1976 | Kwiatkowski et al. | 364/900 |
| 3,976,222 | 8/1976 | Spagnolo | 222/70 |
| 3,976,864 | 8/1976 | Gordon et al. | 324/73 |
| 3,982,230 | 9/1976 | Burkett et al. | 364/900 |
| 3,984,032 | 10/1976 | Hyde et al. | 222/26 |
| 3,991,911 | 11/1976 | Shannon | 222/70 X |
| 3,999,128 | 12/1976 | Janowitz et al. | 324/181 |
| 4,001,599 | 1/1977 | Karklys | 307/141 |
| 4,006,840 | 2/1977 | Shannon | 222/70 X |
| 4,011,967 | 3/1977 | Halsey et al. | 222/70 |
| 4,021,783 | 5/1977 | Highberger | 364/900 |
| 4,034,194 | 7/1977 | Thomas et al. | 364/900 X |
| 4,035,795 | 7/1977 | Fosnough et al. | 307/141.4 X |
| 4,104,725 | 8/1978 | Rose et al. | 364/487 |
| 4,216,461 | 8/1980 | Werth et al. | 364/479 X |
| 4,231,105 | 10/1980 | Schuller et al. | 364/479 X |

Primary Examiner—Joseph F. Ruggiero
Attorney, Agent, or Firm—Hill, Van Santen, Steadman & Simpson

[57] ABSTRACT

A microprocessor based sequence controller for a vending machine performs sequences of functions required for the vending machine operation. The microprocessor unit has two separate storage sections, one of which is not alterable and contains the basic program for the vending machine. The other section is alterable and contains adjustable timing modifications of the basic program. The alterable storage section is modifiable through the use of a separate, selectively connectable service module, which is not normally connected with the sequenced controller during normal vending operations. The start and stop times of each function of the sequence of functions are independently modifiable, and an interlock is provided to assure against unintentional modification of the start and stop times.

8 Claims, 11 Drawing Figures

SEQUENCE CONTROLLER WITH MICROPROCESSOR

This is a continuation of application Ser. No. 928,905, filed July 28, 1978, abandoned.

BACKGROUND

1. Field of the Invention

The present invention relates to sequence controllers, and more particularly, to a sequence controller especially adapted for use with an automatic soup and beverage vending machine.

2. The Prior Art

Soup and beverage vending machines have heretofore been generally controlled by electromechanical devices, incorporating a plurality of cams for actuating a plurality of on-off switches. The cams are mounted on a common shaft for rotation together, and they actuate the switches in a fixed, predetermined sequence, to allow the device to produce a number of output signals in predetermined sequences. The times of occurrences of the signals can be modified by adjusting the angular position of the cams on the shaft, but this modification is very inexact. Typically, after each adjustment, the machine must be cycled and timed, to determine the effect which each adjustment has on operation of the system.

While such systems have been satisfactory for the limited purposes for which they are intended, they are relatively inflexible, and difficult to adjust. It is accordingly desirable to produce a system which is more flexible, and simpler and more economical to manufacture.

Another disadvantage of previous machines is their vulnerability to modification of the timing adjustments by unauthorized persons. Since the timing cams are exposed to tampering by anyone who has access to the interior of a vending machine or the like which incorporates the controller, there is little control over the actual operation of the vending machine by the machine's owner.

Yet another disadvantage results from the fact that the cam shaft must turn through the same angle during each cycle of operation, which means that all possible sequences take the full time required for the longest possible sequence. This materially decreases the vending speed of a vending machine for sequences which can be shorter in duration.

BRIEF DESCRIPTION OF THE INVENTION

It is a principal object of the present invention to provide a sequence controller having substantially more flexibility than past controllers, with the facility for changing the timing and sequence of operations in an exact predetermined manner.

A further object of the present invention is to provide such a controller which is digital in nature, the operation of which is controlled precisely in accordance with digital information.

A further object of the present invention is to provide a controller having a basic program of sequences which is permanently stored, and providing modifying means for storing adjustable modifications to the basic program.

A further object of the present invention is to provide means for making modifications to a basic program in a manner which maintains the integrity of the modifying information.

A further object of the present invention is to provide a sequence controller incorporating an independent service module, separate from the controller, which can readily be employed to make modifications in the programming as needed.

Another object of the present invention is to provide such a service module in a relatively compact and inexpensive form, with a minimum of controls for accomplishing the purposes of the service module.

A further object of the present invention is to provide such a service module with means for rapidly incrementing or decrementing the content of a storage location of the system controller with a minimum of manual controls.

A further object of the present invention is to provide such a service module with means for incrementing or decrementing from the program control storage in a way which enables the operator to make large modifications in the storage contents, while requiring a minimum of equipment and a minimum of time required to make adjustment.

Another object of the present invention is to provide a sequence controller with means for independently controlling the start and stop time of each function controlled by the controller, with minimal apparatus required, to minimize size and cost.

Another object of the present invention is to provide an interlock for preventing unintentional modifications to the sequence times stored within the controller.

A further object of the present invention is to provide a sequence controller in which the selectable sequences have individual time durations, so that short sequences are performed more rapidly than in the past.

Another object of the present invention is to provide such a sequence controller incorporating a microprocessor.

In one embodiment of the present invention, there is provided a microprocessor having stored program means for programming the microprocessor as a sequence controller to produce a plurality of output signals for controlling external apparatus in response to the condition of a plurality of sequence selection switches, and two separate memory sections, one of the memory sections being non-alterable and storing a basic program for control of the sequence and time of production of the output signals, and the other memory section being alterable and storing modifications of the basic program, the alterable memory section being adapted to be altered only through use of a normally separate control module.

In a more specific embodiment, the system controller of the present invention has a service module provided with a display, means for selecting a channel address, and means for modifying individual parts of the content of the storage location identified by said channel address, said service module being adapted to modify the content of said storage location when the service module is in connected relationship to the controller, but not otherwise.

SUMMARY OF THE DRAWINGS

Reference will now be made to the accompanying drawings in which.

DESCRIPTION OF THE PREFERRED EMBODIMENT

Figure 1:
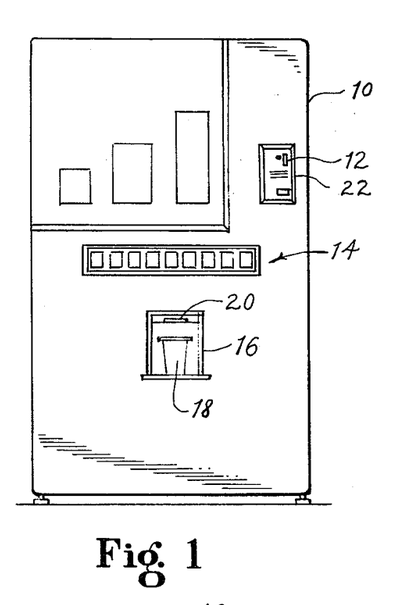
FIG. 1 is a front elevation view of a soup and beverage vending machine incorporating an illustrative embodiment of the present invention.

Referring now to FIG. 1, a soup and beverage dispensing machine 10 is illustrated which is adapted to dispense soup and beverages such as coffee, tea, hot chocolate, etc. The machine has a coin slot 12 and a plurality of pushbuttons 14 which are adapted to select the desired soup or beverage, and to add normal or extra cream and sugar, when the beverage selected is tea or coffee. A compartment 16 is provided at which a cup 18 is presented, and the cup is filled with the selected soup or beverage by means of a dispensing mechanism having a spout 20 supported above the cup 18.

A number of indicators 22 are provided for giving information to the user such as the coins which may be accepted by the machine, and the like. In the machine illustrated in FIG. 1, the ten pushbuttons 14 respectively select black coffee, coffee with cream, coffee with sugar, coffee with cream and sugar, Sanka, hot chocolate, tea, soup, extra cream, and extra sugar. The first eight pushbuttons, which may be referred to as sequence selecting controls, select the soup or beverage to be dispensed, and the last two may be pressed during a vending cycle of coffee, Sanka or tea to select extra cream or extra sugar, respectively.

Figure 2:
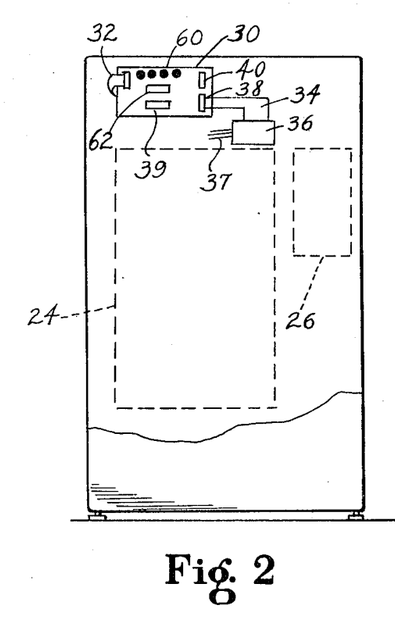
FIG. 2 is an elevational view of a portion of the interior of the apparatus of FIG. 1.

FIG. 2 illustrates a portion of the interior of the apparatus of FIG. 1 with the front cover removed. Within the interior of the machine 10, a number of magazines occupy a space 24, and they are provided for storing the concentrates required for coffee, hot chocolate, tea, soup, etc., which are mixed with hot water during the dispensing operations before being dispensed into the cup 18. A coffee brewer is located in area 26, for the purpose of brewing coffee.

In the space above the locations 24 and 26 a circuit board 30 is located, and the sequence controller for the machine 10 is located on the circuit board 30. The circuit board is connected by means of flat ribbon cables 32 and 34 to two other units, one of which is illustrated in FIG. 2. The unit 36 is connected by means of the cable 34 to a board 30, and preferably the cable 34 is provided with a jack and plug connection 38, at least at one end so that the cable 34 may be disconnected, when that is desirable for service to the board 30 or the unit 36. The unit 36 supports components which are connected by lines 37 to various switches, including the switches 14, to produce signals which are communicated to the apparatus on the board 30. These signals are isolated from any transients which may be present on the lines connected with the switches 14, etc.

A plurality of relays (not shown) are mounted behind the board 30 and are electrically connected with components of the board 30 by means not shown. The relays are selectively energized for controlling the various functions of the dispensing machine 10. For example, when a cup 18 is to be dispensed into the compartment 16, one of the relays is operated, and its contacts close a circuit energizing a motor for operating the mechanism for allowing the dispensing of a single cup 18 into the space 16. The specific construction of the apparatus required for the mechanical functions of the dispensing machine 10 are well-known to those skilled in the vending machine art, and form no part of the present invention. For that reason, they will not be described in detail, it being understood that the relays open and close the required electrical circuits for proper operation of the dispensing machine.

The circuit board 30 supports a microprocessor chip 39, a few other logic chips, one of which is identified by reference numeral 62, and also another connector 40. The connector 40 is a multiple conductor receptable which is adapted to receive a plug jack 42 (FIG. 3), but during normal operation of the apparatus of FIGS. 1 and 2, no jack is in place in the connector 40.

A service module 46 (FIG. 3) is connected to the board 30 via the connector 40 when the sequencer is being serviced. During those times, the plug jack 42 is inserted into the connector 40, and by that means, a ribbon cable 44 interconnects the circuit board 30 with the service module 46. The service module 46 has a display unit 48 adapted for displaying a number of numerical integers with an appropriate decimal point. It also includes a four-position selector switch which is adjustable to select one of four modes of operation. In the vend position of the switch 50, the machine operates normally. When the switch 50 is in its channel position, the display 48 shows one of a plurality of channel numbers. The channel number corresponds to the address of a storage location, in the modifiable memory of the microprocessor, at which is stored a start time and a stop time.

Figure 3:
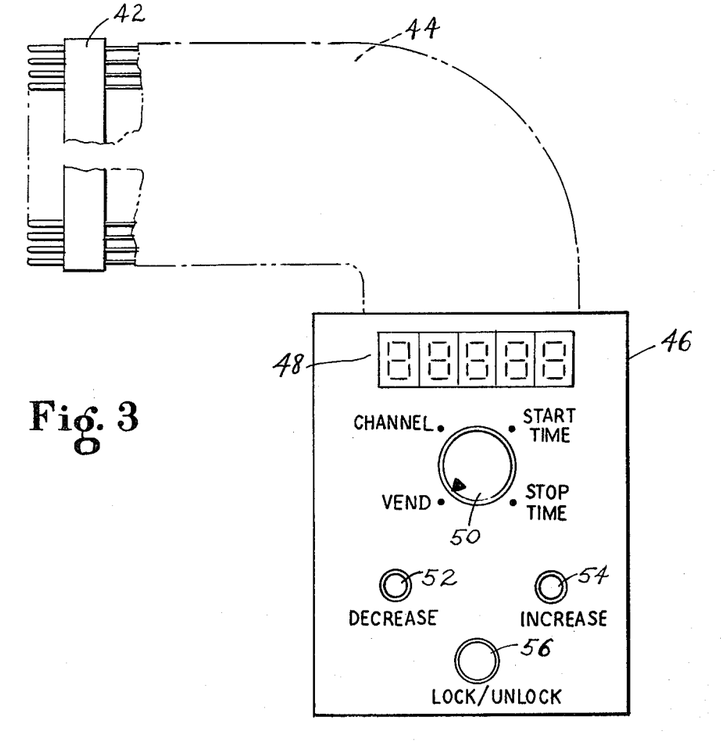
FIG. 3 is an elevational view of an embodiment of the service module associated with the present invention.

When the switch 50 is in its start time position, the display 48 illustrates the start time stored in the storage location identified by channel number displayed when the switch 50 was in its channel position. When the switch 50 is adjusted to its stop time position, the display 48 displays the stop time of the selected channel.

Two pushbuttons 52 and 54 are provided for selectively increasing or decreasing the content of any channel or storage location. When the pushbutton 52 is depressed, the content of the selected channel is decreased at a variable rate. The rate of decrease is quite slow in the beginning, but the rate of decrease continues to increase until a relatively rapid rate of decrease is achieved. The rate of decrease is reset to its initial slow condition each time the pushbutton 52 is released and redepressed. By this means, an operator can, with a few short depressions of the pushbutton 52, very slowly reduce the content of the selected storage location, while he may rapidly reduce the value stored in a selected channel by simply maintaining the pushbutton 52 in depressed condition. A second pushbutton 54 is provided for increasing the value stored in a selected channel, and its rate of increase is variable in the same way as described in connection with the pushbutton 52. This feature allows the service module to make large changes, or small and precise changes, with equal facility.

An interlock pushbutton 56 is provided for executing a lock or unlock function. The pushbutton 56 must be in its unlocked or depressed condition in order to allow the start time to be modified by either of the pushbuttons 52 and 54. The switch 56 must be in its nondepressed or locked condition in order to allow modification of the stop time by either of the pushbuttons 52 or 54. By this means, an operator must manipulate both of the two switches 50 and 56 in order to cause the start time to be modified, and this materially reduces the chance of inadvertently modifying the start time when only the stop time is intended to be changed. Since most modifications will be made with respect to the stop times only, the need to maintain the pushbutton 56 depressed in order to modify start times substantially eliminates inadvertent modifications to the start times. The service module 46 is extremely small and compact, and has only four controls. Notwithstanding the simplicity of the service module, it is amply powerful to completely program the sequence controller supported on the circuit board 30.

The programming of the sequence controller is accomplished by inserting a start time and a stop time into each of a plurality of channel locations. Each channel location corresponds to a given relay or set of relays, and the start and stop times determine the time, during each cycle of operation, at which such relay or group of relays is energized and deenergized.

In the operation of the sequence controller of the present invention, to control the vending machine 10, each vending cycle of operation begins with time zero, when a timer is reset at the beginning of a vending operation. The counter continually manifests the elapsed time since the previous reset. The elapsed time of the timer is periodically (and frequently) compared with every start time and every stop time in every channel, and when a match or coincidence is found, a program is executed which makes a relevance test. The relevance test determines whether the channel which produced the coincidence match is one which is relevant to the particular sequence selected by the pushbuttons 14. For example, when soup is selected, the coffee brewer 26 is not required, and so the times for starting and stopping operation of the coffee brewer are irrelevant during a soup dispensing cycle. If the relevance test determines that the channel producing the coincidence match is relevant to the selected operation, the relays associated with that channel will be energized or deenergized, depending on whether the start or the stop time produced the coincidence match. When the last relevant coincidence is recognized, the operation of the vending machine halts, and the machine is immediately ready for a subsequent vending cycle, without waiting for the duration of the longest possible sequence.

It will be appreciated that the start and stop times cannot be modified unless the service module of FIG. 3 is in position relative to the circuit board 30. This is a desirable feature in connection with vending machines, because it is very desirable to prevent any unauthorized tampering with the timing of the various operations of the vending machine. It is not feasible to make the interior of the vending machine completely inaccessible, because there are circumstances which require such access. For example, coins must be removed from the coin box, and periodically supplies must be added to the magazines of the machine. Since it is necessary to have access to the interior of the machine available to unauthorized service personnel, it is highly desirable to provide some other way of preventing unauthorized tampering with the machine timing. By use of the present invention, no timing adjustments may be made without access to a service module, and since the service module is separate and may be maintained in the possession of authorized service personnel only, access to the machine timing is in that way limited to qualified service personnel.

The microprocessor unit 39 is preferably a single chip unit such as Intel Model No. 8048. Such a microprocessor unit has two internal areas of storage. One storage area is a read only memory, or ROM, and the other storage area is a random access memory, or RAM. The contents of the ROM are fixed, and it is not possible to modify the contents in the field. The information stored im ROM is retained during periods of power outages, so that a restart program contained in the ROM section of memory, can restart the apparatus after a power failure. A RAM, however, is a volatile memory, and a power failure results in the loss of the contents stored in the RAM. Only the data stored in the RAM portion of memory can be modified by operation of the service module (FIG. 3), and no provision is made in the present invention for operating the sequence controller without access to the RAM, allowing for continued operation of the machine even following a power failure.

In the present invention, data relative to the start and stop times is stored partly in the ROM and partly in the RAM. The start and stop time data stored in the ROM forms a basic program, service to permit operation of the machine in an acceptable, but not necessarily optimum, fashion.

The RAM section of memory is loaded, by using the service module 46, with incremental times which may serve to either increase or decrease the values of the basic program start and stop times stored in the ROM. Thus, a RAM is used to enable each vending machine to function in an ideal or optimum manner, with the exact times of operation being calculated by subtracting or adding the basic values stored in ROM to the modifying values stored in RAM. Since the modifications stored in RAM are typically small, compared to the basic times stored in ROM, the RAM memory capacity is conserved, and ample RAM capacity remains for performance of the functions of the MPU which require use of RAM for a scratchpad memory, the integrity test, the relevance test, etc.

Although the content of the RAM is typically lost during periods of power outage, a rechargeable battery maintains power to the RAM portion during power outage. If protection against only short periods of power interruption is desired, a relatively low capacity battery source will suffice. Larger capacity batteries must be used in order to extend the time of preservation of data in the RAM to account for longer interruptions of power. Alternatively, an independent non-volatile memory such as an EAROM may be employed, which may be modified by writing, as a RAM, but does not lose its storage content during losses of applied power (up to ten years). When an EAROM is used, the incremental data stored therein for the start and stop times is never lost for any duration of power interruption. Since EAROM'S are more expensive than other types of memory, it is highly beneficial to conserve their memory capacity, and this can be accomplished in the present invention by storing only modification values in the EAROM, Alternatively, the EAROM stores the times which are actually used as the start and stop times, so that incremental data need not be stored.

Figure 4:
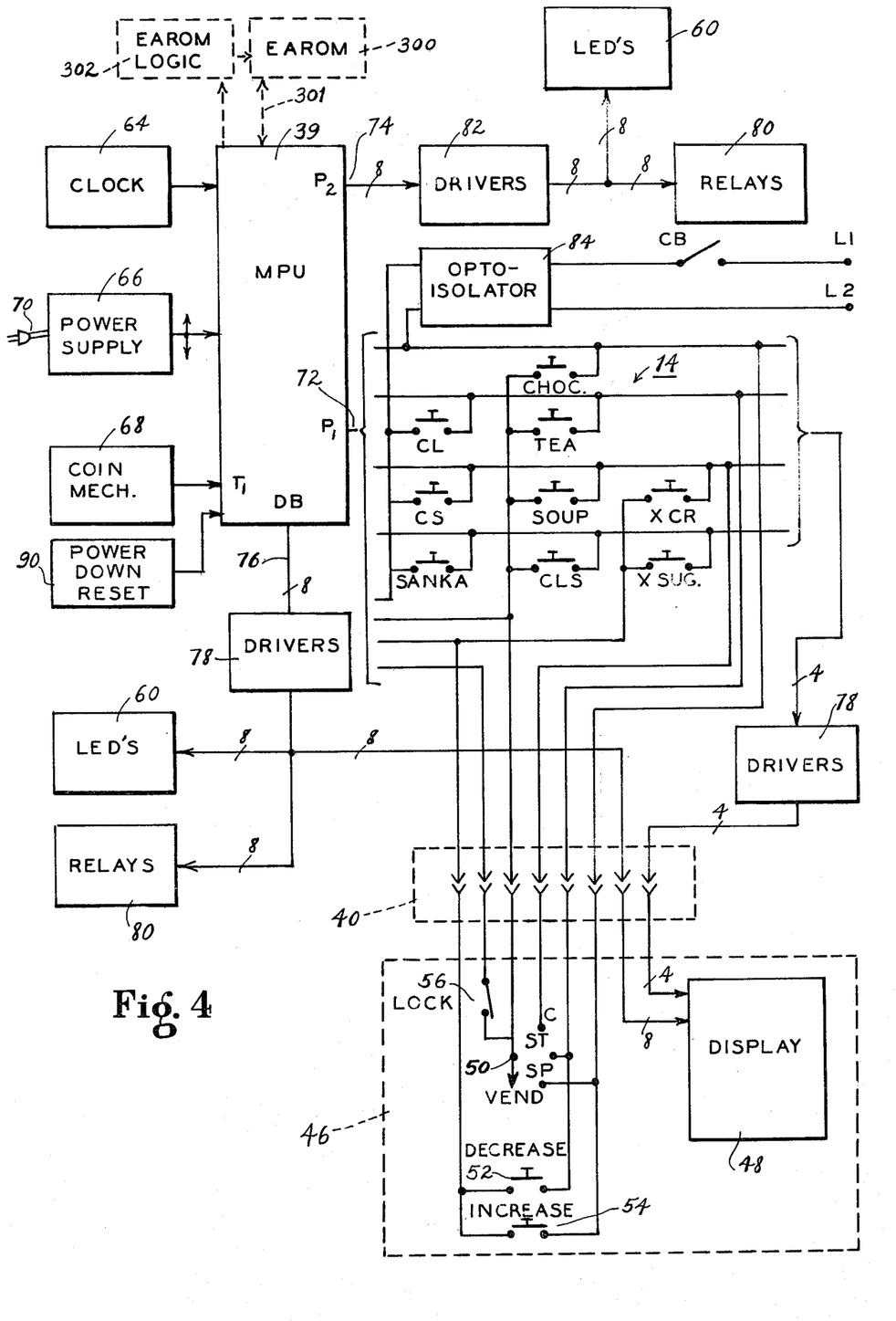
FIG. 4 is a functional block diagram of a sequence controller incorporating an illustrative embodiment of the present invention.

Reference will now be made to FIG. 4, which illustrates a functional block diagram of the sequence controller of the present invention. The MPU 39 is functionally illustrated as a single block, to which is connected a source of clock pulses 64 for controlling the timing of the MPU 39, a power supply 66, and a coin mechanism 68. The power supply 66 comprises a conventional power supply for furnishing the required voltage levels to the MPU and to the other units, derived from conventional AC power available on lines 70. The coin mechanism 68 is connected to a terminal of the MPU 39 which may be interrogated as to its condition. When the MPU used is the Intel Model 8048, the coin mechanism 68 is connected to the T1 terminal of the MPU, which, during the execution of suitable instructions, may be tested for a high or low value. The source of clock pulses 64, the power supply 66 and the coin mechanism 68 are all conventional units, so that they need not be described in detail. The function of the coin mechanism 68 is to supply a signal to the terminal T1 when the proper amount of coinage has been deposited in the coin receiving slots, so that a dispensing or vending cycle can begin. A dispensing cycle begins, after deposit of the requisite number of coins, by depression of one of the soup or beverage selecting buttons 14.

The MPU 39 is provided with two ports P1 and P2 and a data bus DB. The data bus consists of eight lines 76, which are connected from the MPU 39 to a set of drivers 78. The output of the drivers is connected to appropriate ones of a set of LED's 60, and to appropriate ones of a set of relays 80.

The port P2 is connected over eight lines 74 to a set of drivers 82, and the output of the drivers is connected to some of the LED's 60 and to appropriate ones of the relays 80.

Port P1 is connected to eight lines 72 and performs both input and output functions. When it functions as an input, it senses a condition of a plurality of switches, and when it functions as an output, it supplies control signals to the display unit 48, designating which part of the display is to be energized at any given time. The outputs of the data bus are also connected to the display unit 48, via drivers 78, and furnish signals indicating the information which is to be displayed at various positions of the display.

When the lines 72 function as inputs, they sense the condition of the nine switches 14 on the front panel of the dispensing machine, and also the condition of the switches on the service module 46. The nine switches are each connected to unique combinations of the eight lines 72, so that the closing of any one of the switches is recognized during operation of the MPU 39 because of such interconnection. Preferably, all of the ten switches are isolated from any effects on the power lines by means of opto-isolator units, such as the one 84 which is shown in association with the switch CB. The switch CB (for selecting black coffee) connects the opto-isolator 84 to a source of input power which may be conventional AC power applied to terminals L1 and L2. The opto-isolator 84 functions to complete an electrical circuit between two output leads, which are electrically isolated from the input leads connected to L1 and L2, and therefore are not affected by transient conditions on the line. The two output leads of the opto-isolator 84 are connected to the first and fifth lines of the eight lines 72. The other eight panel switches, although indicated diagrammatically in FIG. 4, are preferably arranged with opto-isolators in the same manner as the switch CB.

Six of the eight lines 72 are connected through the connector 40 to various ones of the switches of the service module 46. The lock switch 56 is connected between the sixth and eighth lines, the decrement switch 52 is connected between the second and seventh lines, and the increment switch 54 is connected between the first and seventh lines of the lines 72. The switch 50 selectively connects the sixth line of the lines 72 to the first, second and third lines of the set. The condition of the switches 50-56 is determined during operation of the MPU 39 in the same manner as described above in connection with the panel switches.

The disconnection of the service module 46, by opening the connector 40, does not interfere with the relationship between the sequence controller and the switches 14 and relays 80, which execute the various operations required during dispensing cycles. The sequence controller is therefore effective for normal operation of the vending machine therefor without the presence of the service module 46. Since only one service module 46 is required for a large family of sequence controllers, the cost, complexity, and power consumption of the sequence controller is materially reduced.

The power-down/power-on reset circuit 90 provides for the sensing of an imminent power failure or removal of power. When this condition is sensed, the appropriate input pin of the MPU 39 is driven to a zero voltage level, thereby initializing the MPU 39 internal program, disabling the relays 80, and protecting the RAM contents from being erroneously altered during a marginal power supply condition. This reset input pin is held at zero volts until the power is restored to the proper level as sensed by the power-down/power-on reset circuit 90.

Reference will now be made to FIGS. 5a-5d, which taken together form a flow chart illustrating operations performed by the sequence controller of the present invention. The flow chart assumes that the MPU which is used is the Intel Model 8048. The several blocks of the flow charts shown in FIGS. 5a-5d are representative both of the structure of the present invention, and the function of that structure. Although in the preferred embodiment, most of the decisional and operational units shown in these figures are contained internally within the MPU chip, it is equally feasible to construct them of conventional logic integrated circuits, or even with discrete components. Thus, the representation of the boxes in FIGS. 5a-5d are both structural and functional, and can be interpreted as hardware and/or software. In these figures, rectangles are provided to illustrate operational devices or units which may be flip-flops, solenoids, relays, etc.; and where diamonds are provided to represent decision units which may be comparators, coincidence gates, or the like. Since the physical construction of each operation unit, and each decision unit, is obvious to those skilled in the art from a consideration of its function, the specific construction which may be employed for the various operation units and decision units will not be described in detail.

The decision units and operation units shown in FIGS. 5a-5d operate in a prescribed sequence, and control the manner in which the various functions are carried out. For that reason, the flow charts will be described in terms of one unit passing control to the next unit, implying that the previous operation or decision has been completed.

Operation is initiated when power is applied to the apparatus of FIG. 4, via the power supply 66, by operation of the power-down/power-on reset unit 90 (FIG. 5a), causing a reset of the internal program counter of the MPU 39 to zero. This causes the program to be entered at the proper starting point. Control is next passed to a unit 104 which explicitly turns off the vend relay, sets the channel number code to zero and resets the interrupt timer 101 to zero. The interrupt timer 101 is a timer contained within the MPU 39, but may be a discrete timer. Its function is to count clock pulses constantly, and when the timer counter overflows, a signal is produced which passes control to unit 104, restarting the program from that point. The interrupt timer counter is reset at frequent intervals during normal operation of the programs of FIGS. 5a-5d, so that during normal operation it never overflows. If it should overflow because of a transient fault condition, the operation of the apparatus is restarted and then resumes normally.

Figure 5A:
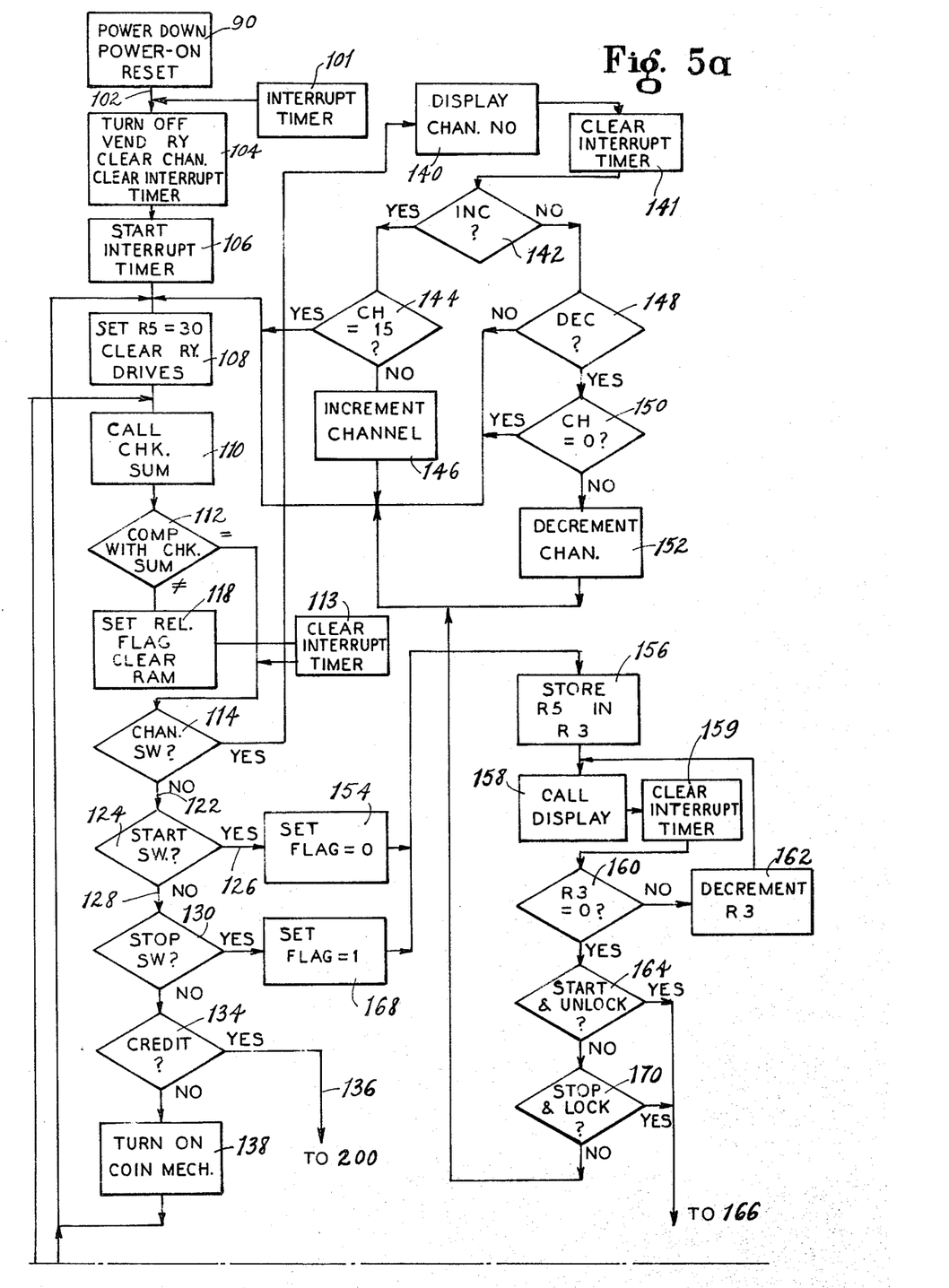
FIGS. 5a-5d are flow charts of sequences of operations performed by the apparatus of FIG. 4.

Unit 104 passes control to a unit 106 which next starts the interrupt timer, which then begins incrementing continuously at a fixed rate independently of the main program flow. Control is then passed to the unit 108, which sets the content of register 5 equal to 30, and clears all of the output flip-flops for driving the relays 80. The contents of register 5 are used to execute the variable rate increment and decrement function when the control module is used.

The unit 108 passes control to a unit 110 which functions to call a subprogram for performing a check sum program. The check sum program constitutes the integrity test of the data stored in the RAM and it is performed by successively addressing every storage location in the RAM where a modification of a start time or a stop time is stored, and adding together the total sum of all of the modifications. This results in a check sum, which is used in the integrity test.

When the check sum is calculated, control is passed to the unit 112 which compares the calculated check sum with a previously calculated value stored in the RAM. If the calculated value equals the stored value, control is passed to the unit 114 over a line 116. If the calculated value does not equal the stored value, control is passed to the unit 113 through a unit 118 which operates to set a reload flag, and clears the modifying contents of the RAM to all zeros.

The integrity test performed by the units 110 and 112 insures that the contents of the RAM have not been altered, for example, as a result of a power failure exceeding the capacity of the battery power supply. Following such a power failure, the contents of every RAM location is random, and the integrity test fails with a high degree of certainty. Under those circumstances, the random contents of the RAM are ignored and the RAM is set to zero, so that the start and stop times of the basic program are not modified. No other program alterations are necessary, because the addition or subtraction of zero does not modify the basic program times. The reload flag is an output which is connected to one of the other LED's 60, so that if the integrity test fails, the lighting of that specific LED 60 will indicate that service is necessary to reload the contents of the RAM.

The unit 113 provides for one of the frequent resets of the interrupt timer, as described above.

The unit 114 determines whether the channel switch has been operated, i.e., if the switch 50 is in its channel position. If it is, control is passed over a line 120. If not, control is passed over a line 122 to a unit 124, which determines whether the switch 50 is in its start time position. If it is, control is passed over a line 126, and if not, control is passed over a line 128 to a unit 130. The unit 130 determines whether the switch 50 is in its stop time position. If it is, control is passed to a line 132, and if not, control is passed to a unit 134. Since the unit 134 receives control only if the switch 50 is in its vend condition, or the service module 46 is not connected, the vend cycle is indicated. The unit 134 determines whether credit has been received, as determined by a signal from the coin mechanism 68 at the T1 terminal of the MPU 39. If it is, control is passed over the line 136 to start the vend program. If not, control passes to the unit 138 which turns on the coin mechanism 68 and then returns control to the unit 108. As long as the service module 46 is not connected, or the switch 50 is not in one of its three service positions, the program will cycle through the units just described, until credit is established by depositing the proper coins in the coin slot 12. Then, the vend program is entered over line 136, to initiate it as a sequence of operations which result in the vending or dispensing of the selected soup or beverage.

If the control module 46 is connected, and the switch 50 is in its channel position, the line 120 passes control to a unit 140, which causes the display 48 to display the content of the channel register.

When the unit 140 has displayed the channel number, control is passed to the unit 141 for clearing of the interrupt timer, and then to the unit 142, which examines the state of the increment pushbutton switch 54. If it has been depressed, control passes to the unit 144 which compares the display channel number with number 15. If the channel number is 15, control returns directly to the unit 108. In the example described, 15 is the highest channel number, so that depressing the pushbutton 54 when the channel number is 15 is an erroneous condition.

If the unit 144 determines that the channel number is not 5, control passes to the unit 146 which increments the content of the channel register, and then returns control to the unit 108. The loop described beginning with 108 and ending with 146 is then repeated, with each repetition resulting in an increase of the content of the channel register by one. In this way, any channel may be readily selected by incrementing the channel register until the correct channel is arrived at.

If the unit 142 determines that the increment pushbutton has not been depressed, control passes to the unit 148 which determines whether the pushbutton 52 has been depressed. If the unit 148 determines that neither of the pushbuttons 52 and 54 is depressed, control returns to the unit 108, and the program sequence beginning with 108 and ending with 148 is repeated until one of the pushbuttons is depressed to increase or decrease the content of the channel register. Since unit 140 is operated periodically, for each repetition of this loop, the channel number appears to be continuously displayed.

If the unit 148 determines that the pushbutton 52 has been depressed, control passes to the unit 150, which compares the state of the channel register with zero. If the channel register is equal to zero, the number of the lowest channel, a decrease operation is erroneous and control passes directly back to the unit 108. If the channel register is not set to zero, control passes to the unit 152 which decrements the channel register before returning control to 108.

Through the program described above, any desired channel is quickly selected and displayed by the use of the controls of the service module 46.

Figure 5B:
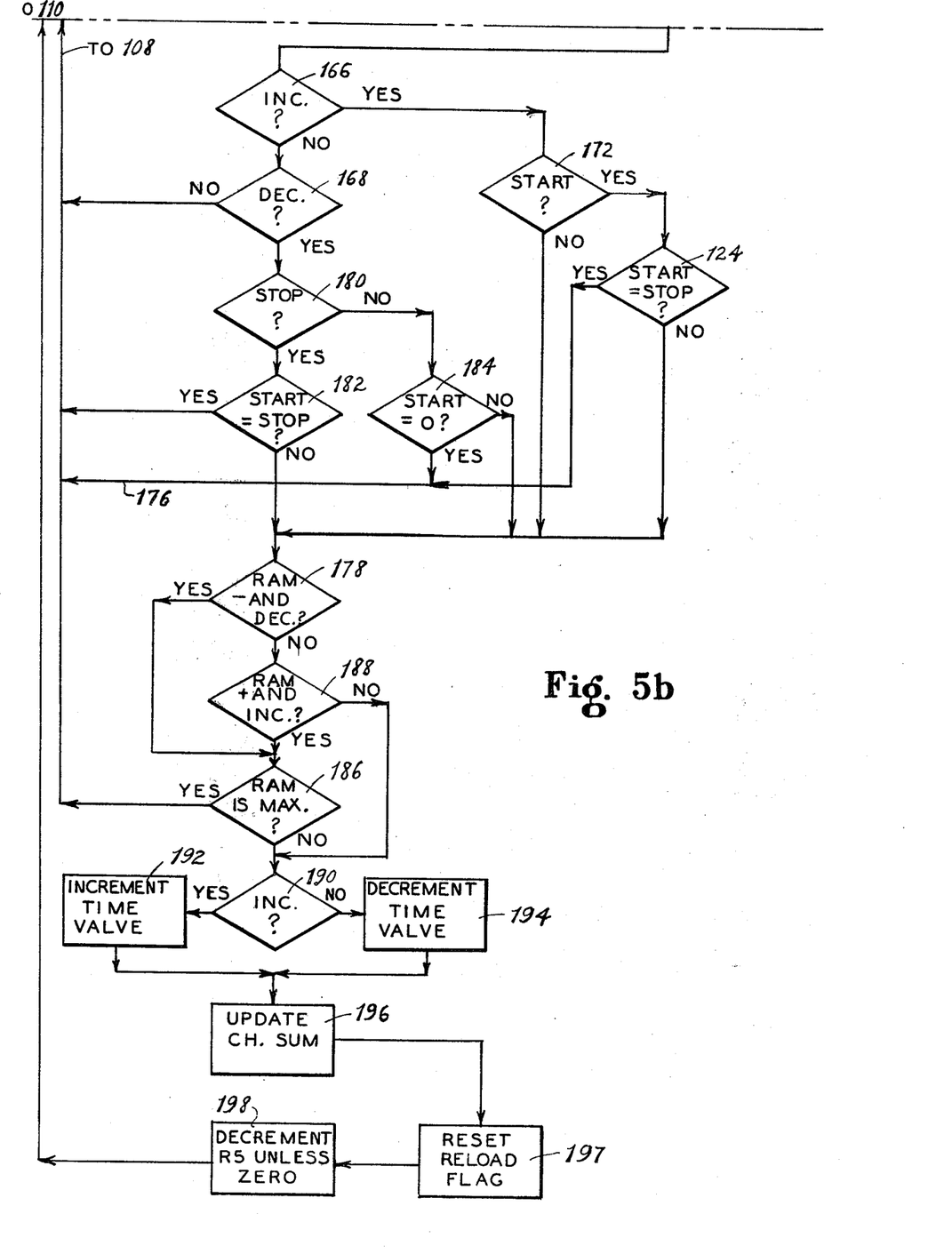

When the desired channel has been found, the switch 50 is moved to either its start time position or its stop time position. When it is moved to its start time position, control is passed over the line 126 to a unit 154 where it sets a flag equal to zero. The flag will be referred to as the start-stop flag, and a condition of zero indicates that the switch 50 is in its start time position. Control is then passed to a unit 156 which stores the content of register 5 in register 3, and then passes control to a unit 158, which calls a display subroutine. The display routine operates to cause a display device 48 to display the content of the selected register, which corresponds to a modification of a start time or a modification of a stop time. When the switch 50 is in its start time position, the part displayed is the start time stored in the selected channel. Control passes from unit 158 to unit 159 for the clearing of the interrupt timer, and then to unit 160 which determines whether R3 is equal to zero. Since the unit 160 first receives control when the content of R3 is 30 (and not zero), control is passed to unit 162, which functions to decrease the content of the R3 register by 1, and then returns control to the unit 158. The loop including the units 158, 160 and 162 accordingly is traversed 30 times before R3 is equal to zero. Then control is passed to a unit 164 which determines whether the switch 50 is in its start time position, with the lock pushbutton 156 in its unlocked condition. If so, control is passed to a unit 166 to initiate the steps which bring about a change in the content of the selected channel.

When it is desired to modify the stop time, the switch 50 is adjusted to its top time position, and then the unit 130 receives control, and passes control to the unit 156 through a unit 168 which sets the start-stop flag equal to 1, signifying that the stop time is to be modified. Subsequent operations are performed in the manner described, down to the unit 164. If the unit 164 determines that the switch 50 is not in its start time position, or the pushbutton 56 is not in its unlocked position, control is passed to unit 170 which determines whether the switch 150 is in its stop time position, with the switch 56 in its locked condition. If so, control is passed to the unit 166 for initiating the change in the selected start or stop time. If the unit 170 determines that either the switch 50 is not in its stop time position, or the lock 56 is not operating, an erroneous condition is indicated, and control is passed directly back to the unit 108 without modifying the content of the channel.

The steps which have just been described constitute the interlock program, which requires the operation of the switches 50 and 56 in conjunction. If these switches are not properly operated, the times stored in the selected channel cannot be altered, and this feature substantially prevents unintentional modification of the start and stop times.

The unit 166 inspects the condition of the pushbutton 54. If it is not depressed, control is passed to a unit 168 which examines the condition of the pushbutton 52. If it is also not depressed, control is returned to the unit 108, and continues to cycle through the loop beginning with 108 and ending with 168 repetitively until one of the pushbuttons 52 or 54 is depressed. When the unit 166 recognizes that the pushbutton 54 has been depressed, control is passed to a unit 172 which determines if the switch 50 is in its start time position. If it is, control is passed to a unit 174 which determines whether the start time and stop time stored in the selected channel are equal. If so, the incrementing of the start time is an erroneous condition, and control is returned to the unit 108 over a line 176. If not, control is passed to a unit 178 which executes the next step in bringing about a change in the selected start or stop time. If the unit 172 determines that the switch 50 is not in its start position, the unit 178 receives control directly.

When the pushbutton 52 is depressed, the unit 168 passes control to a unit 180, which determines whether the switch 50 is in its stop position. If it is, control is passed to a unit 182 which determines whether the start and stop times of the selected channel are equal. If so, any attempt to decrease the stop time is erroneous and control is returned directly to the unit 108 over the line 176. If not, the unit 178 receives control. When the unit 180 determines that the switch 50 is not in its stop time position, control is passed to a unit 184 which determines whether the start time is zero. If so, it cannot be decremented and control is returned to the unit 108. If the start time of the selected channel is not equal to zero, control is passed to the unit 178.

The unit 178 determines whether the sign of the selected start or stop time is negative and the decrease pushbutton 52 has been depressed. If so, it passes control to a unit 186 which determines whether the current content of the selected time of the selected channel is at a maximum value. An attempt to increase it further is erroneous and controls return to the unit 108. The unit 186 can also receive control from a unit 188, when the unit 178 determines that the sign of the modifier stored in RAM is not negative, or the pushbutton 52 has not been depressed. Under these conditions, the unit 188 receives control and determines whether the modifier stored in the RAM is positive and the pushbutton 54 has been depressed. If so, control passes to 186. If not, control passes to a unit 190. The unit 190 can also receive control from the unit 186 if the content of the selected RAM location is not at a maximum value. The unit 190 again inspects the condition of the pushbutton 54. If it is depressed, control passes to unit 192 which increases the selected time of the selected channel by one unit. Otherwise, control passes to unit 194 which decreases the selected time by one unit. Then control passes to unit 196 which updates the checks sum stored in RAM, an operation which is necessary every time the start and stop time modifiers stored in the RAM are adjusted. The control is passed to unit 197 which resets the reload flag, and then unit 198 decreases the content of the register 5 and then returns control over line 122 to the unit 110.

As long as either pushbutton 52 or 54 is maintained depressed, the steps described above are repeated and unit 198 receives control before returning control to the unit 110. Each time the unit 198 receives control, the content of register 5 is decreased by one, which shortens the time required in the loop including the units 158, 160 and 162. This loop is repeated, each time it is entered, the number of time corresponding to the content of register 5, since register 3 is set accordingly by the unit 156 just before the loop is entered. Since the initial content of register 5 is 30, thirty repetitions of the loop occur between each adjustment of the content of the selected channel, whether it is being increased or decreased. After it is adjusted by 30 units, in the course of 30 repetitions of the loop including the unit 198, the content of register 5 has been reduced to zero, and the loop including the unit 162 is bypassed. In this way, the rate at which the modified values are adjusted is increased as long as one of the pushbuttons 52 or 54 remains depressed. In this way, large adjustments may be made to the contents of RAM in a short time, simply by the expedient of holding the appropriate pushbutton depressed. Very fine adjustments are made equally well simply by depressing the appropriate pushbutton for short periods of time.

By the programmed step described above, any channel may be selected, and its modification of the start time and stop time may be adjusted up or down easily and quickly to enter desired value. Whenever an adjustment is made, the unit 197 resets the reload flag automatically, so that it will again be capable of indicating a subsequent failure of the integrity check.

When the unit 134 (FIG. 5a) receives control and recognizes credit, it passes control to the first unit in the vend program over a line 136. The first unit is the unit 200 (FIG. 5c) which causes the switches 14 to be read in, together with a conventional debounce program, for avoiding errors due to bouncing of the switch contacts. After the unit 200 operates, control is passed to the unit 202 which determines whether one of the selection switches 14 has been depressed. If not, control is returned over a line 204 to the unit 108. If a selection has been made, control passes to the unit 204 which decodes the switches and places in the upper half of the register 4 a representation of what sequence has been selected. Control is passed to a unit 206 which resets the interrupt timer and clears the internal clock which controls the timing of the functions during the vend cycle. 206 passes control to a unit 208 which sets a flag F1 to zero, which allows start times to be checked for coincidence. It also sets the channel register to 15, so that the first channel to be checked for a time coincidence is channel No. 15.

Figure 5C:
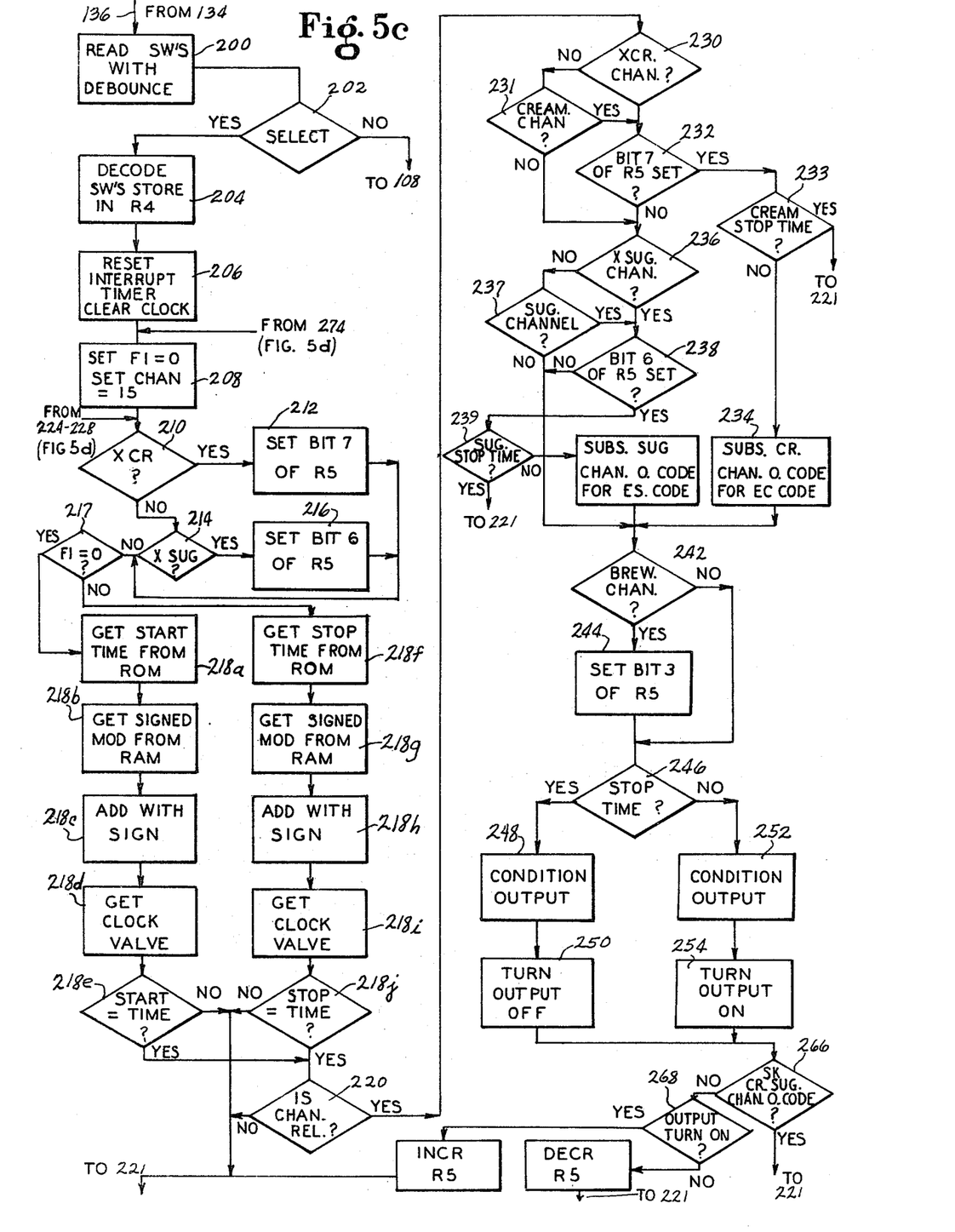

After the channel register is set to 15, unit 210 receives control and inspects the switches 14 to determine whether the extra cream switch has been depressed. If so, control is passed to the unit 212 which sets bit No. 7 of register 5. If not, a unit 214 examines the condition of the extra sugar switch, and passes control to unit 216 which sets bit 6 of register 5 if the extra sugar switch has been depressed. Unit 217 then determines if F1=0, indicating a start time. If so, control passes to a group of units 218a-e which determine whether the channel 15 start time corresponds to the time of the clock. The unit 218a gets the start time for channel 15 from ROM and the unit 218b gets the signed modification parameter from RAM. Unit 218c adds them; unit 218d gets the clock value; and unit 218e checks for coincidence. If a coincidence is found, control passes to unit 220. Otherwise, control passes to unit 221. If the unit 217 determines that F1=1, the same sequence is performed for the stop time of the selected channel, by operation of units 218f–218j. As described hereinafter, all the channels are checked for start time coincidence, and than all are checked for coincidence with stop times.

If the clock value is not equal to either the start time or the stop time, control passes to a unit 221 (FIG. 5d) which clears the interrupt timer. Then a unit 222 inspects the state of the channel register. If the channel register is not zero, control passes to a unit 224 which decreases the state of the channel register by one and then returns control to the unit 210. This sequence of operations beginning with 210 and ending with 224 is repeated until the start times of all sixteen channels have been compared with the clock; after which control is passed over a line 225 to a unit 226. The unit 226 examines the state of the flag F1 which was set to 0 by the unit 208, before the start times were compared with the clock. Since the first time the unit 226 receives control, the flag F1 is 0, control passes to the unit 228 which resets the channel register to 15; sets the stop bit F1 to 1; and returns control to the unit 210. The sequence beginning with the unit 210 and ending with the unit 228 is then repeated, so that the stop times of all channels are compared with the timer so that a coincidence can be detected.

Figure 5D:
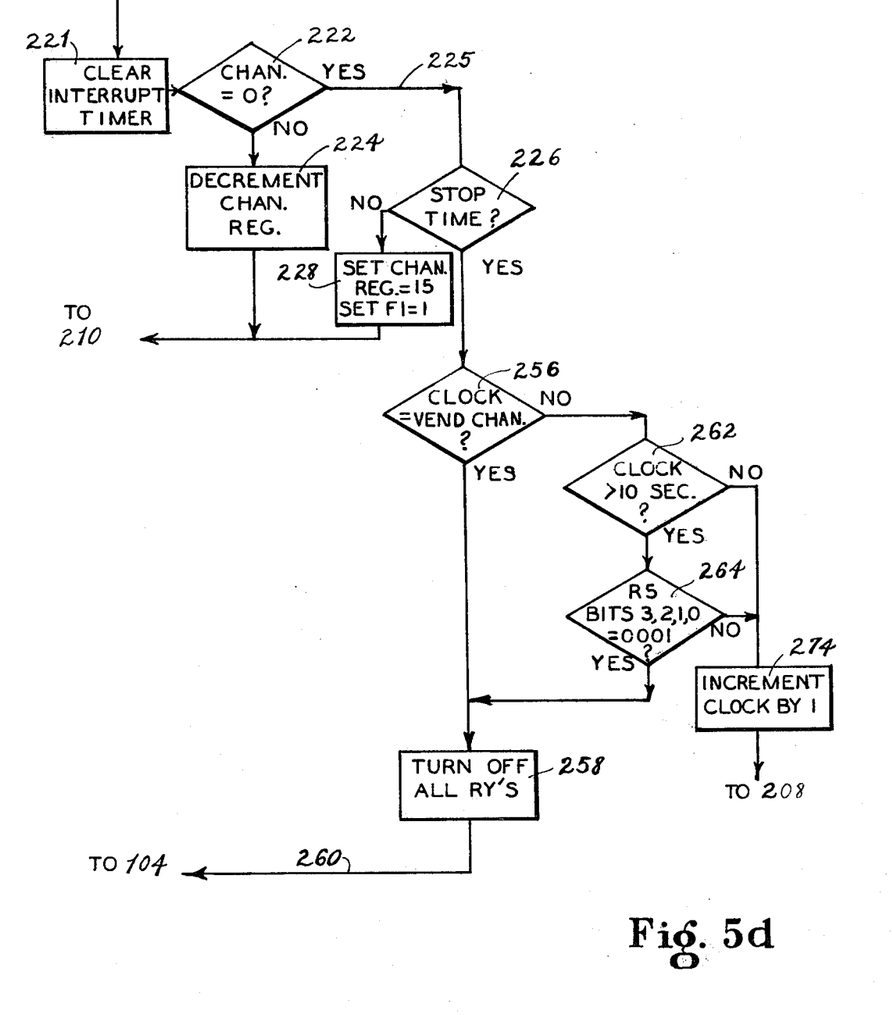

When a coincidence is detected by the unit 218, control is passed to the unit 220 which performs a relevance test by determining, from the data stored in the upper half of the register 4, whether the channel for which a coincidence has been detected is one which is used in the selected sequence. If not, control passes directly to the unit 221. If the relevance test is positive, control passes to a unit 230 which determines whether the channel for which coincidence has been detected is the extra cream channel. If it is the extra cream channel, control passes to the unit 232 which examines bit 7 of the R5 register. This bit would have been set by the unit 212 in response to recognition of the extra cream pushbutton. If unit 230 determined that it had not been the extra cream channel, control passes to unit 231 to determine if it is the cream channel. If it is, control is passed to the unit 232 for the bit 7 test of R5. If bit 7 is found to be set, control passes to the unit 233 which determines whether the time for which coincidence has been found is the cream stop time. If it is, control is passed directly to unit 221, thus causing no change in cream dispenser status. If it is not cream stop time, control is passed to unit 234 for the substitution of the cream channel output code for the extra cream code, and thence to unit 242. The subsequent turn on or turn off of the cream dispenser is described below. If the test by unit 231 for cream channel was negative, or if bit 7 of R5 was not found to be set by unit 232, control is passed to unit 236 which determines if the coincidence channel is the extra sugar channel. If it is, control passes to unit 238 which examines bit 6 of R5, which may have been set by the unit 216. If unit 236 determined that it had not been the extra sugar channel, control passes to unit 237 to determine if it is the sugar channel. If it is, control is passed to the unit 238 for the bit 6 test of R5. If bit 6 is found to be set, control is passed to the unit 239 which determines whether the time for which coincidence has been found is the sugar stop time. If it is, control is passed directly to unit 221, thus causing no change in the sugar dispenser status. If it is not sugar stop time, control is passed to unit 240 for the substitution of the sugar channel output codes for the extra sugar code and then to unit 242 for the subsequent turn on or turn off of the sugar dispenser. Unit 242 can also receive control from unit 237 if the sugar channel test was negative, or from unit 238 if bit 6 of R5 was not found to be set.

The unit 242 determines whether the brew channel is the channel for which a coincidence has been recognized, and, if so, passes control to unit 244 which sets bit 3 of register 5 to indicate that a long cycle is required, since the coffee dispensing cycles employing the brewer require longer time durations than other cycles. Control is then passed to unit 246 which receives control directly from the unit 242 if the brewer channel is not the coincidence channel. The unit 246 determines whether the coincidence time is a stop time, and if so, passes control to a unit 248 which conditions the apparatus for turning off an output bit. Then control is passed to a unit 250 to accomplish turning off of the appropriate output. If the unit 246 recognizes a start time instead of a stop time, it passes control to the unit 252 which conditions the apparatus for turning an output on and then passes control to a unit 254 to accomplish turning on of the selected output.

Control is then passed to unit 266, which may also receive control from 250 in the output turn off sequence. In the unit 266, the current channel output code is tested to determine if it is the code for Sanka, cream or sugar. If it is not one of these, unit 268 then determines if this is an output turn-on by sensing if F1=0. If it is, R5 is incremented by one to provide for a count of the outputs which are currently energized. If F1=1, indicating an output turn-off, R5 is decremented by one, thereby decreasing the count of the outputs currently energized. Control is then passed to unit 221.

When the unit 226 determines that the last recognized coincidence is a stop time, control is passed to a unit 256 instead of to the unit 228. The unit 256 determines whether the time of the vend cycle has equalled or exceeded the time value of the vend channel plus a modifier which may have been stored in RAM memory and if it has, control is passed to a unit 258 which operates to turn off all the relays and return control over a line 260 to the unit 104. Although a single decision unit 256 has been illustrated, it will be understood that several different operations are required, and the unit 256 is representative of a series of units such as units 218a-218e, which check for a start time comparison. The unit 256 establishes the maximum time for any vending operation, and restores the apparatus to its normal condition if, for any reason, such as extraneous noise or the like, any output relay has been improperly left on.

If the unit 256 determines that the maximum cycle time has not yet elapsed, control is passed to a unit 262 which determines whether the elapsed time of the vend cycle is greater than 10 seconds. If not, control is passed to unit 274 for incrementing of the clock by 1, and then to the unit 208 and the sequence described above is repeated. If more than 10 seconds have elapsed, control is passed to the unit 264 which examines the state of bits 0, 1, 2 and 3 of register 5. If bit 0, 1 or 2, which together constitute the output status count for the number of relays currently energized, is set (meaning at least one is still on), or if bit 3 is set, indicating that a long cycle is required because the brewer has been selected, control is returned to the unit 208. If none of these bits are set, control is passed directly to the unit 258, and all relays are explicitly turned off (even those which had previously been turned off).

By operation of the units 256, 262 and 264, as well as the unit 244, no selected sequence requires more than 10 seconds, except for a sequence which involves operation of the brewer, and then the sequence is limited to the vend channel time, which is nominally 18 seconds, unless modified. Accordingly, selected sequences which do not involve operation of the brewer are permitted to occur with almost twice the speed of brewer-depending sequences.

Figure 6A:
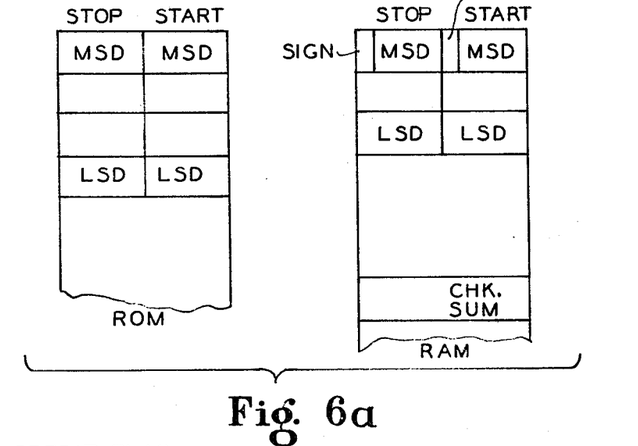
FIGS. 6a-6c are maps of selected sections of storage of the apparatus of FIG. 4.
Figure 6B:
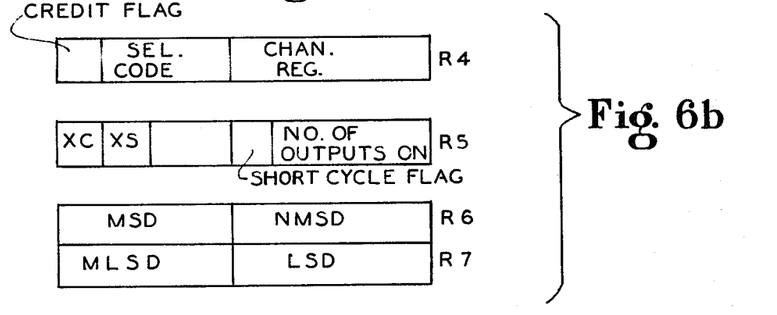
Figure 6C:
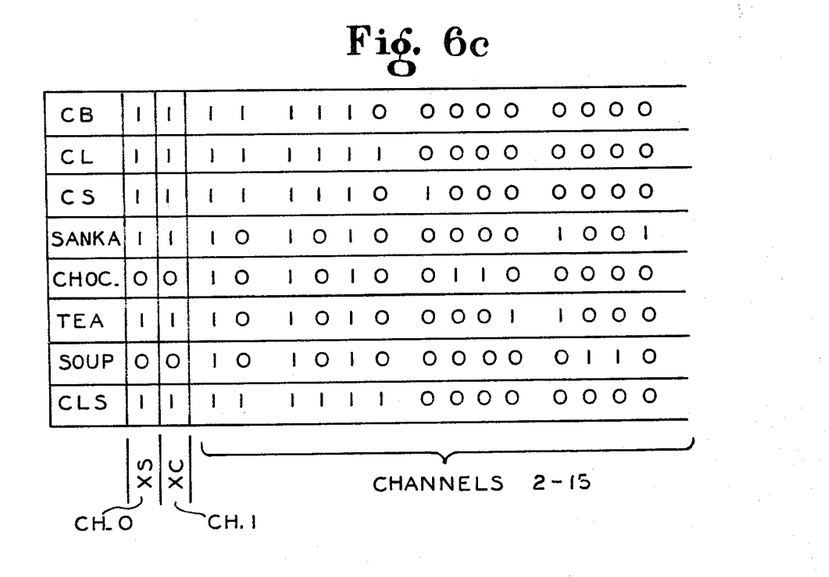

FIGS. 6a-6c illustrate portions of the ROM and RAM storage sections of the present invention. In FIG. 6a, corresponding parts of the ROM and RAM are illustrated, in which are stored, respectively, the basic times and the modifying parameters of a typical channel. Four decimal digits are stored in ROM for the basic times, and three decimal digits (of which the most significant digit is a maximum of 7) is stored in RAM. Thus, a basic time may be any time within the range 0-9999 units, and the modifying parameter may be within the range of minus 799 to plus 799. Also, the total of the basic time plus the modifier must be within the range of 0-9999 units. Since the modifying parameters are typically small, not as much RAM storage capacity is required.

The actual time value of each unit of the stored start and stop times depends on the speed of operation of the apparatus. In one embodiment, each unit corresponded to 0.05 seconds. FIG. 6a also shows the check sum stored in a portion of RAM.

FIG. 6b shows the significance assigned to several of the MPU's operating registers. Register 4 stores, in one bit, an indication that the proper coins have been deposited as determined by signals from the coin mechanism. Three other bits store a representation of the selected sequence, in accordance with which of the sequence-selecting pushbuttons 14 are operated. The other half of register 4 constitutes the channel register, for designating the channel being accessed currently in ROM and RAM.

In register 5, two bits store flags indicating that extra cream and sugar have been selected; another bit stores an indication of whether the current cycle is short or long, i.e., whether the brewer has been selected, and three other bits maintain a count of the number of outputs turned on, so that a subsequent vend program can be initiated as soon as all outputs of a preceding vend cycle are turned off, signifying the end of that cycle. This enables vending cycles to be shorter than the vend cycle time for non-brewer vends. The unit 258 functions as a back-up, after 10 seconds, in case some fault prevents a turn off of one or more outputs.

Registers 6 and 7 constitute the internal timer, which may be counted from 0 to 9999 (counting in binary-coded decimal). It can, of course, count from 0 to $2^{16}$ when operated as a binary counter of 16 stages. If desired, the data stored in the ROM and RAM sections for the basic times and modifications may also be in binary.

FIG. 6c illustrates a table used in the relevance test. The table is stored in ROM, and identifies which channels are relevant to any of the eight selectable sequences. No data is stored for channels 0 and 1, because an indication of whether extra sugar or cream is selected is stored in register 5 (FIG. 6b).

When an EAROM is used, it is a separate unit 300 (FIG. 4) connected to the MPU via data bus lines 301. The EAROM is operated for reading and writing by a logic unit 302, under control of the MPU unit 39. The details of the logic unit 302 are well known to those skilled in the art. When the EAROM is used, it is accessed for modification by the service module in the same way that the internal RAM is accessed, which has been described above in detail. The EAROM may store either the modification parameters, like the RAM, or may store the complete programmed times, in which case, the ROM of the MPU 39 need not store the basic times, and this memory space is made available for program instructions and the like.

It is apparent that the sequence controller described above may be adapted for other applications than the control of a soup and beverage vending machine. Various additions and modifications may be made by those skilled in the art without departing from the essential features of novelty of the present invention, which are intended to be defined and secured by the appended claims.

What is claimed is:

1. For use with program controlled apparatus having storage means for storing program data and modifiable storage means for storing data including timing data used by the program controlled apparatus, a service module comprising a hand-held unit, said unit containing display means for displaying said data, and switch means for permanently modifying only said timing data, and an electrical connector connected with said switch means and display means, said connector being releasably connectable with said storage means, whereby the data content of said storage means may be displayed by said display means and modified by said switch means only while said service module is connected with said storage means by said connector, said program data other than said time data being unmodifiable by said service module.

2. Apparatus according to claim 1, wherein said program controlled apparatus includes means for periodically testing the state of said switch means when said service module is connected with said storage means, and for modifying the content of said storage means only in response to said switch means being in an operated condition during said testing.

3. Apparatus according to claim 1, wherein said switch means comprises means for selecting a predetermined location within said modifiable storage means, and said display means comprises means for displaying an identification of the location selected.

4. Apparatus according to claim 1, wherein said switch means comprises separate switches for increasing and decreasing the data content of said modifiable storage means.

5. Apparatus according to claim 1, wherein said modifiable storage means stores first and second separate data items, and wherein said switch means comprises a plurality of separate switches and means responsive to operation of one of said separate switches for allowing modification of said first data item and to non-operation of said one switch for allowing modification of said second data item.

6. Apparatus according to claim 1, wherein said modifiable storage means stores data representative of a plurality of times at which events are to occur during operation of said program controlled apparatus, said program controlled apparatus including means for repetitively executing a sequence of operation steps, at least one of said steps testing whether said service module is connected with said storage means, and a subsequent step for selectively modifying said data only if said service module is connected.

7. For use with program controlled apparatus having means for storing program data and modifiable storage means for storing data including timing data used by the program controlled apparatus, a service module comprising a hand-held unit, said unit containing first switch means for selecting timing data to be modified and second switch means for modifying only said timing data, said first and second switch means being releasably connectable to said program controlled apparatus by an electrical connector, whereby selected timing data within said storage means may be modified by operation of said second switch means, said program data other than said timing data being unmodifiable by said service module.

8. Apparatus according to claim 7, wherein said second switch means comprises a manually operable switch, and including means connected to said switch for modifying said selected data incrementally.

* * * * *